United States Patent
Nakic et al.

(10) Patent No.: US 11,142,116 B1
(45) Date of Patent: Oct. 12, 2021

(54) HEADLAMP ADJUSTER BLOCKING ASSEMBLY AND METHOD

(71) Applicant: Ford Global Technologies, LLC, Dearborn, MI (US)

(72) Inventors: Donald John Nakic, Livonia, MI (US); Nicholas James Nowicki, Southgate, MI (US); Anthony Nicholas Aquilina, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/996,521

(22) Filed: Aug. 18, 2020

(51) Int. Cl.
*G09F 3/10* (2006.01)
*B60Q 1/04* (2006.01)
*B60Q 1/068* (2006.01)
*B60S 5/00* (2006.01)
*H04W 12/77* (2021.01)

(52) U.S. Cl.
CPC ............... *B60Q 1/068* (2013.01); *B60S 5/00* (2013.01); *G09F 3/10* (2013.01); *H04W 12/77* (2021.01); *B60Q 2200/30* (2013.01)

(58) Field of Classification Search
CPC ....... B60Q 2200/30; B60Q 1/068; B60S 5/00; H04W 12/77; G09F 3/10
See application file for complete search history.

(56) References Cited

U.S. PATENT DOCUMENTS

| | | | |
|---|---|---|---|
| 5,951,157 A * | 9/1999 | Shirai | B60Q 1/0683 362/529 |
| 6,017,137 A * | 1/2000 | Suehiro | B60Q 1/0683 362/289 |
| 6,050,712 A | 4/2000 | Burton | |
| 6,082,882 A | 7/2000 | Akiyama et al. | |
| 6,239,966 B1 * | 5/2001 | Thomas | H02B 1/06 200/43.22 |
| 6,247,834 B1 * | 6/2001 | Suehiro | B60Q 1/0686 362/460 |
| 6,459,051 B1 * | 10/2002 | Barkley | H01H 15/00 200/16 E |
| 7,077,551 B2 | 7/2006 | Dinant | |
| 7,153,012 B2 * | 12/2006 | Sakurai | B60Q 1/0683 362/523 |
| 10,464,469 B2 | 11/2019 | Ekladyous et al. | |
| 10,940,789 B2 * | 3/2021 | Duerkopp | B60Q 1/0683 |
| 2019/0293276 A1 * | 9/2019 | Pearson | F21V 21/14 |
| 2021/0025544 A1 * | 1/2021 | Garcia | F16M 11/041 |

OTHER PUBLICATIONS

Vitodo Slide Cover—Amazon.com—Published Nov. 1, 2019—Accessed Aug. 18, 2021 (Year: 2019).*

* cited by examiner

*Primary Examiner* — Arman B Fallahkhair
(74) *Attorney, Agent, or Firm* — David Coppiellie, Esq.; Carlson, Gaskey & Olds, P.C.

(57) ABSTRACT

A headlamp assembly includes, among other things, a lamp housing, a headlamp adjuster system within the lamp housing, and an access control member moveable from an accessing position to a covering position while coupled to the lamp housing. The headlamp adjustor assembly is accessible through an aperture in the lamp housing when the access control member is in the accessing position. The headlamp adjustor assembly is inaccessible through the aperture in the access control member when the access control member is in the covering position.

18 Claims, 4 Drawing Sheets

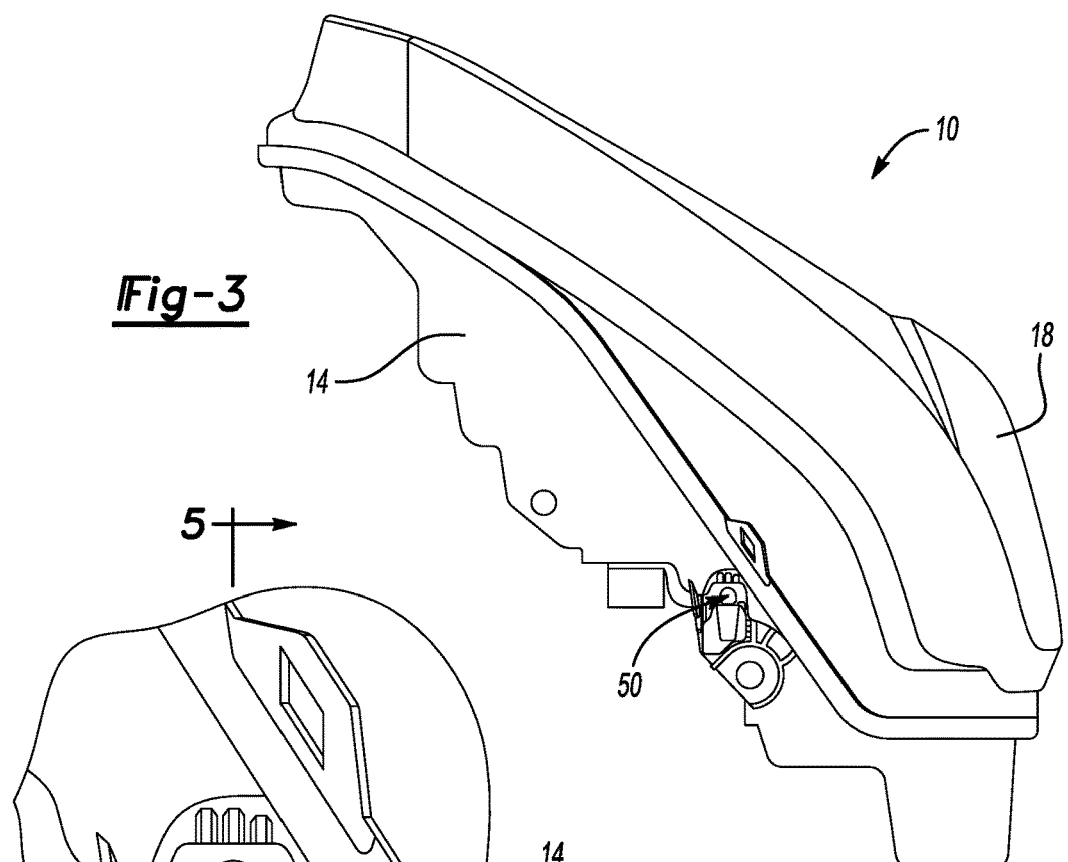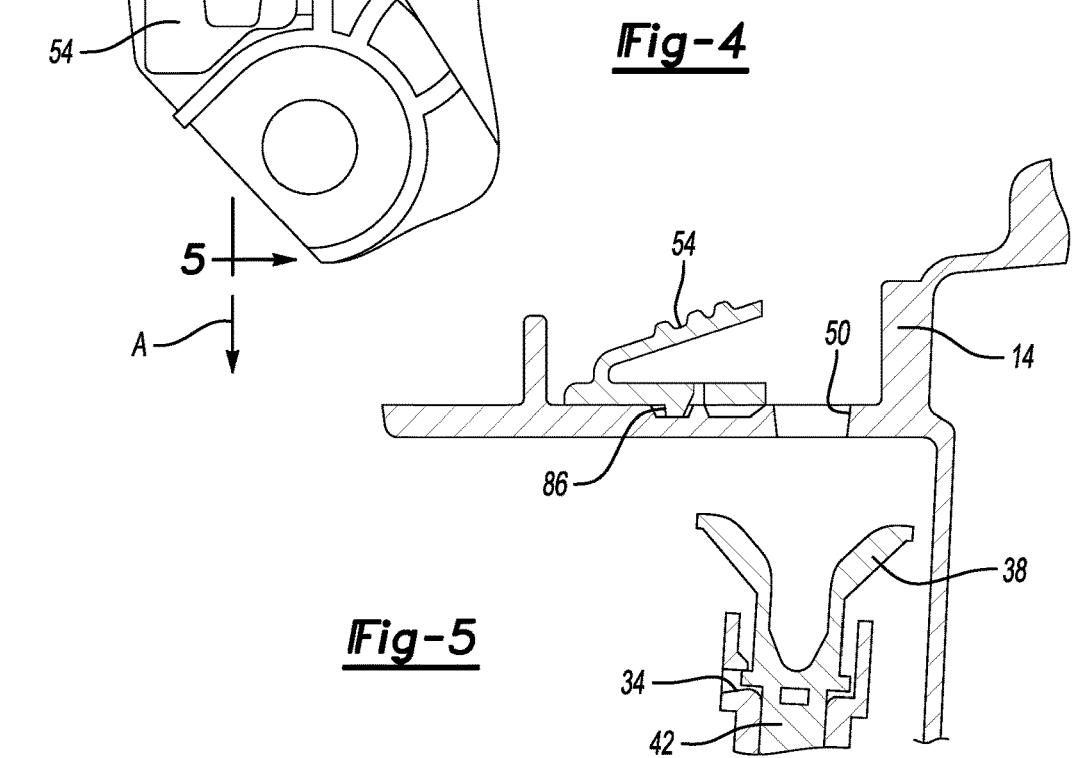

HEADLAMP ADJUSTER BLOCKING ASSEMBLY AND METHOD

TECHNICAL FIELD

This disclosure relates to an exemplary assembly and method of blocking access to a headlamp adjustor system after a headlamp has been adjusted and aimed.

BACKGROUND

Vehicles can include headlamps that have an adjuster mechanism to aim a headlamp beam correctly in a horizontal (cross-car) direction. New emerging technologies in lighting may require vehicle assembly plants to aim the headlamps during vehicle production. There are regulations that prohibit adjuster mechanisms from being accessible by an end user.

SUMMARY

A headlamp assembly according to an exemplary aspect of the present disclosure includes, among other things, a lamp housing, a headlamp adjuster system, and an access control member moveable from an accessing position to a covering position while coupled to the lamp housing. The headlamp adjustor assembly is accessible through an aperture in the lamp housing when the access control member is in the accessing position. The headlamp adjustor assembly is inaccessible through the aperture in the access control member when the access control member is in the covering position.

In another example of the foregoing assembly, the headlamp adjuster system includes an adjuster cap coupled to a shaft to adjust an aiming position of a headlamp.

In another example of any of the foregoing assemblies, the aiming position is a horizontal aiming position.

In another example of any of the foregoing assemblies, the access control member is slidably coupled to the lamp housing such that the access control member slides from the accessing position to the covering position while coupled to the lamp housing.

In another example of any of the foregoing assemblies, the access control member includes a pair of arrow tabs that fit within respective slots of the lamp housing to couple the access control member to the lamp housing.

In another example of any of the foregoing assemblies, the respective slots each extend from a first end portion to an opposite second end portion that is closer to the aperture in the lamp housing than the first end portion. The first end portion is wider than the second end portion.

In another example of any of the foregoing assemblies, the access control member is configured to snap-fit to the lamp housing when the access control member is in the covering position to hold the access control member in the covering position.

Another example of any of the foregoing assemblies includes a label that is concealed when the access control member is in the accessing position and revealed when the access control member is in the covering position.

In another example of any of the foregoing assemblies, the label includes a QR code that is readable when the access control member is in the covering position.

In another example of any of the foregoing assemblies, the label is secured to a recessed area of the lamp housing.

In another example of any of the foregoing assemblies, the access control member is a polymer-based material.

In another example of any of the foregoing assemblies, the access control member includes a snap-feature and a ramped area covering the snap-feature. The snap-feature configured to engage the lamp housing when in the covering position. The ramped area is configured to block access to the snap-feature.

A method according to another exemplary aspect of the present disclosure includes the steps of inserting an adjustment tool within an aperture of a lamp housing, engaging the adjustment tool with a headlamp adjuster system, adjusting a position of a headlamp using the adjustment toll and headlamp adjuster system, withdrawing the adjustment tool from the aperture, and sliding an access control member from an accessing position to a covering position where the access control member covers the aperture.

In another example of the foregoing method, the access control member is coupled to the lamp housing when in both the accessing position and the covering position.

In another example of any of the foregoing methods, the access control member includes at least one arrow tab that couples the access control member to the lamp housing when the access control member is in the accessing position and when the access control member is in the covering position.

In another example of any of the foregoing methods, the access control member includes a snap-feature and a ramped area covering the snap-feature. The snap-feature is configured to engage the lamp housing when in the covering position. The ramped area is configured to block access to the snap-feature.

In another example of any of the foregoing methods, sliding the access control member to the covering position reveals a label.

In another example of any of the foregoing methods, the label includes identifying information about the headlamp.

In another example of any of the foregoing methods, the label is disposed on a recessed area of the lamp housing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 shows a top view of the headlamp assembly of FIG. 1.

FIG. 4 shows a close up view of an access control member coupled to a lamp housing of the headlamp assembly of FIGS. 1-3 when the access control member is in an accessing position.

FIG. 5 shows a section view at line 5-5 in FIG. 4.

DETAILED DESCRIPTION

This disclosure details exemplary assemblies and methods of restricting access to a headlamp adjuster system that is used to adjust or aim a headlamp of a vehicle.

The adjusting of a headlamp can occur during vehicle production. For example, an assembler can interface with a headlamp adjuster to adjust light from the headlamp. Regulations can require that an end user, e.g., customer, is blocked from access to the headlamp adjuster. Some assemblies and methods of this disclosure can help to block access to the headlamp adjuster and to confirm that such access has been blocked.

Figure 1:
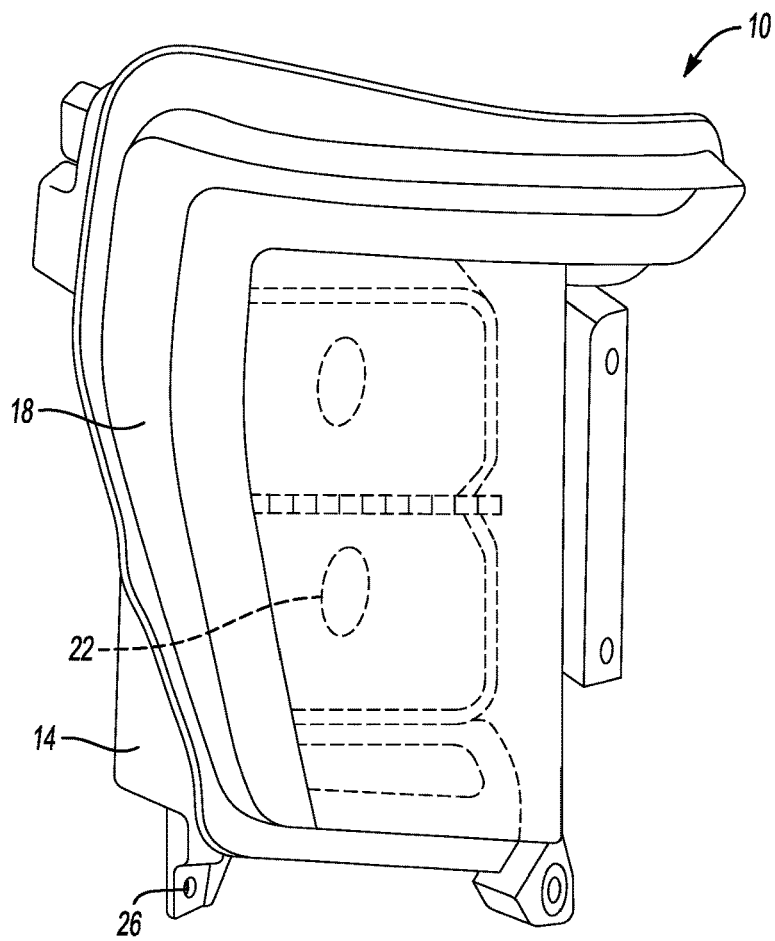
FIG. 1 shows a front view of a headlamp assembly according to an exemplary aspect of the present disclosure.
Figure 2:
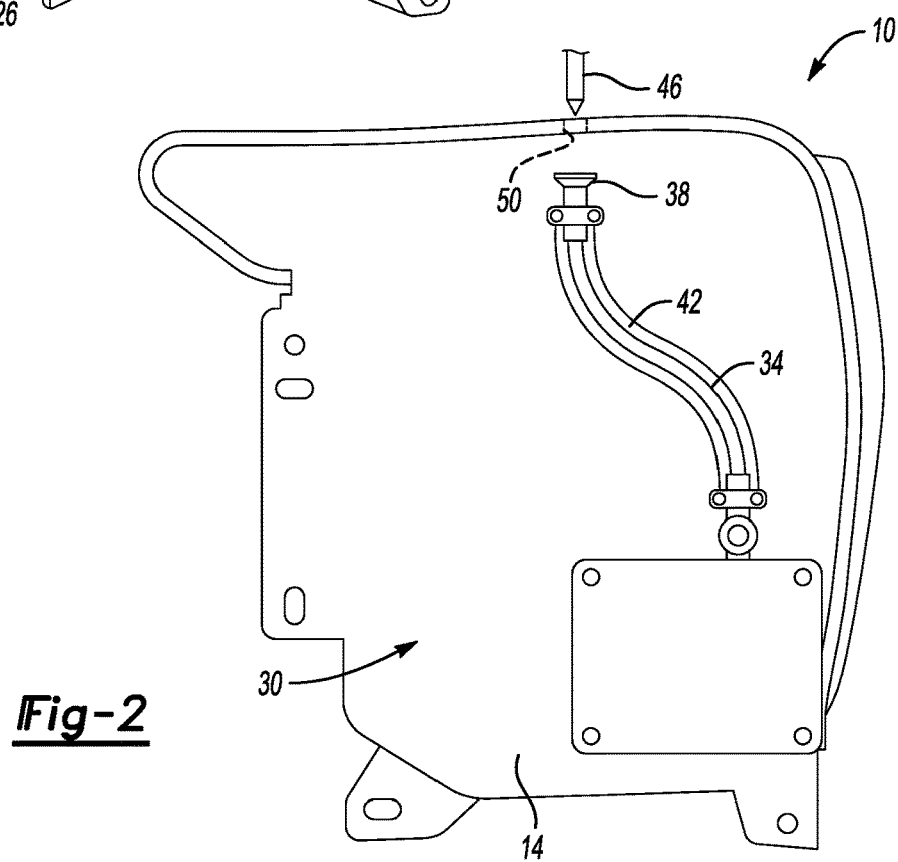
FIG. 2 shows a rear view of the headlamp assembly of FIG. 1.

With reference to FIGS. 1-3, a headlamp assembly 10 includes a lamp housing 14, a lens 18, and lighting devices 22. The headlamp assembly 10 can be secured to a front of a vehicle. The headlamp assembly 10 is a passenger side headlamp assembly. Another headlamp assembly can be secured to the driver side of the vehicle.

Mechanical fasteners, such as bolts, can extend through apertures 26 in the lamp housing 14 to secure the headlamp assembly 10 to a body structure of the vehicle. When the headlamp assembly 10 is secured to the body structure, the lens 18 faces substantially forward, and a back 30 of the headlamp assembly 10 faces rearward. Forward and rearward are with reference to the general orientation of the vehicle.

The headlamp assembly 10 includes a headlamp adjuster system 34 disposed along the back 30 of the headlamp assembly 10. When the headlamp assembly 10 is secured to the vehicle, the headlamp adjuster system 34 is held between the lamp housing 14 and the body structure of the vehicle.

The headlamp adjuster system 34 includes an adjuster cap 38 coupled to a shaft 42. During production of the vehicle, after the headlamp assembly 10 has been secured to the body structure of the vehicle, the assembler can insert an assembly tool 46 through an aperture 50 in the lamp housing 14. The tool 46 extends through the aperture 50 to engage the adjuster cap 38. The tool 46 can be a screwdriver, for example.

Turning the tool 46 can turn the adjuster cap 38 and the shaft 42, which can adjust an aiming position of the headlamp assembly 10. In particular, turning the adjuster cap 38 with the tool 46 can adjust a horizontal aiming position of the headlamp assembly 10. That is, turning the adjuster cap 38 can adjust a positioning of a beam of light emitted from the lighting devices 22 to move to desired horizontal positions.

After the assembler has adjusted a horizontal position of the lighting devices 22 and, particularly, a horizontal aiming position of the headlamp assembly 10, the tool 46 is withdrawn from the aperture 50.

With reference now to FIGS. 4-7, and continuing reference to FIG. 3, the headlamp assembly 10 includes an access control member 54 that, in the exemplary embodiment, is coupled to the lamp housing 14.

Figure 6:
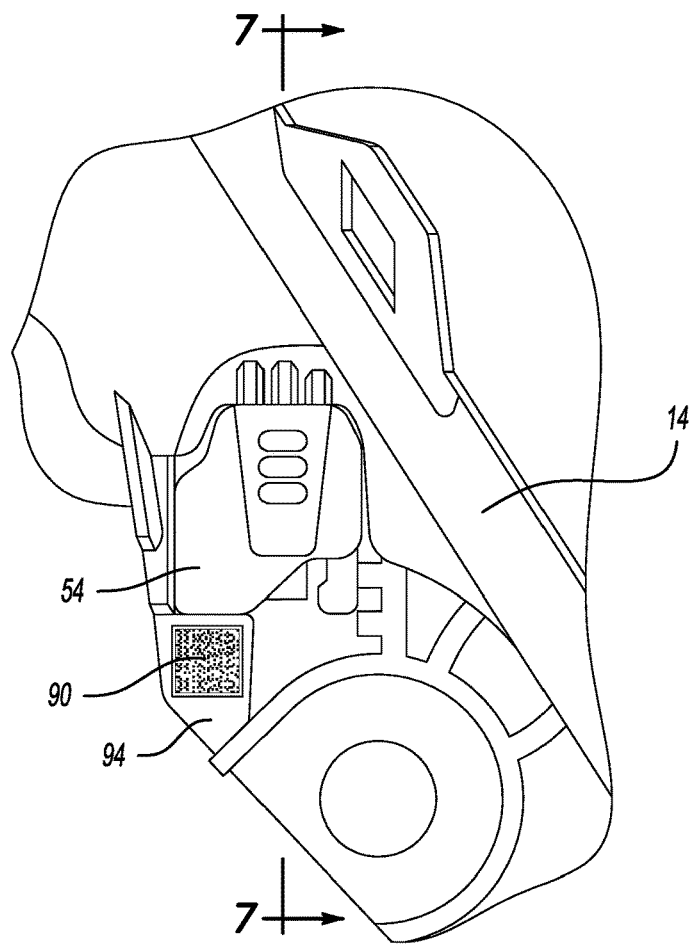
FIG. 6 shows the close up view of the access control member has been transitioned to a covering position.
Figure 7:
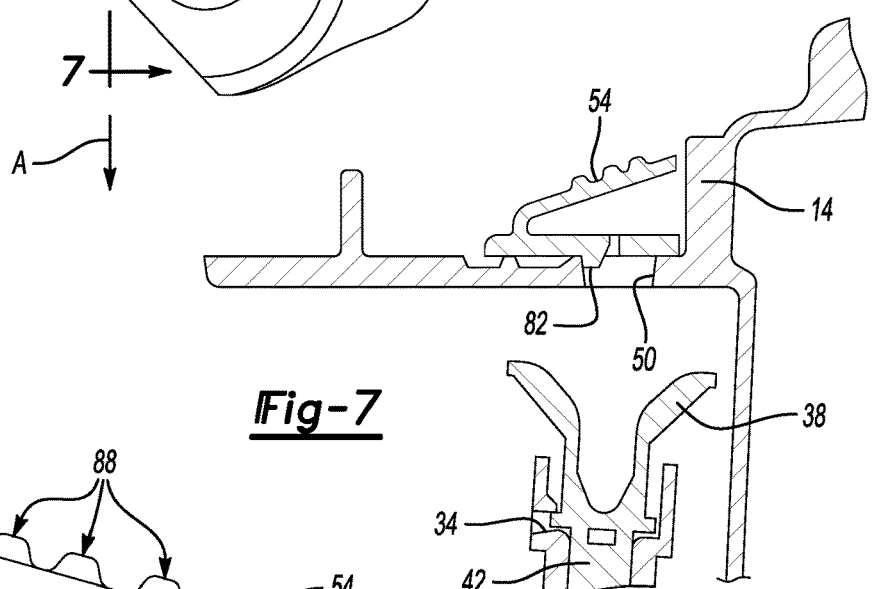
FIG. 7 shows a section view at line 7-7 in FIG. 6.

To permit the assembler to access the headlamp adjuster system 34 through the aperture 50, the access control member 54 is positioned in an accessing position as shown in FIGS. 4 and 5. After the assembler has withdrawn the adjustment tool 46 from the aperture 50, the access control member 54 is transitioned from the accessing position of FIGS. 4 and 5 to a covering position as shown in FIGS. 6 and 7.

In the covering position, the headlamp adjuster system 34 is effectively inaccessible through the aperture 50. This is because the access control member 54 is covering the aperture 50.

In the exemplary embodiment, the access control member 54 is, notably, coupled to the lamp housing 14 when in the accessing position and when the access control member 54 is in the covering positon. Some known headlamp assemblies have blocked access through apertures using a plug, push pin, or similar structure that is inserted into the aperture to block access. Such structures are not coupled to any lamp housing while still permitting access through the associated aperture. Further, confirming that such structures are seated within the lamp housing can be challenging.

In the exemplary embodiment, the access control member 54 is slidably coupled to the lamp housing 14 when in the accessing position and when in the covering position. The exemplary access control member 54 slides along an axis A from the accessing position of FIGS. 4 and 5 to the covering position of FIGS. 6 and 7. In another example, an access control member could slide from the accessing position to the covering position by rotating about a pivot point from the accessing position to the covering position.

Figure 8A:
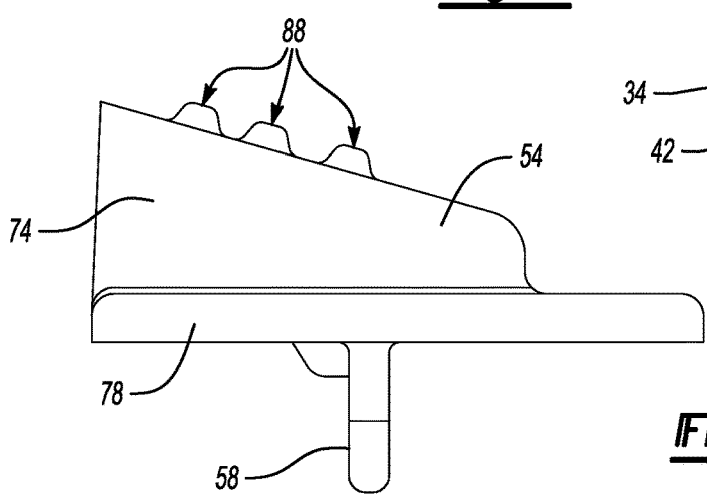
FIG. 8A shows a side view of the access control member of FIGS. 3-7.
Figure 8B:
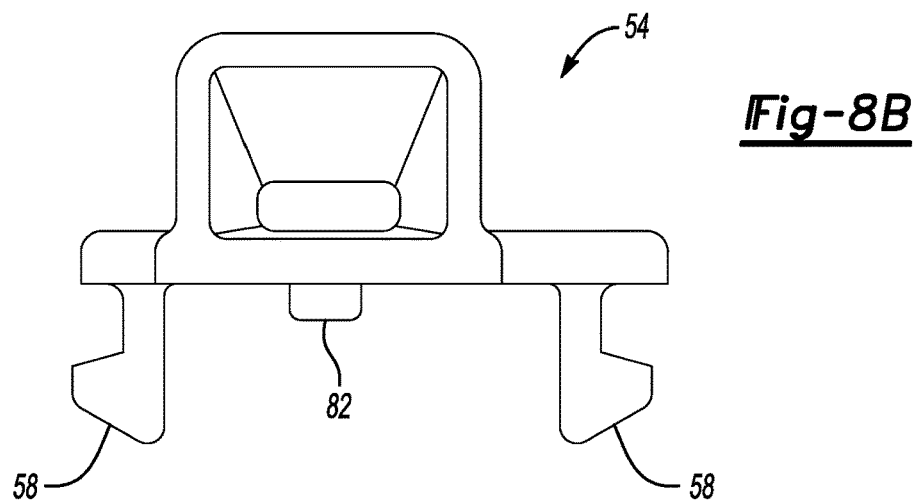
FIG. 8B shows an end view of the access control member of FIG. 8A.
Figure 8C:
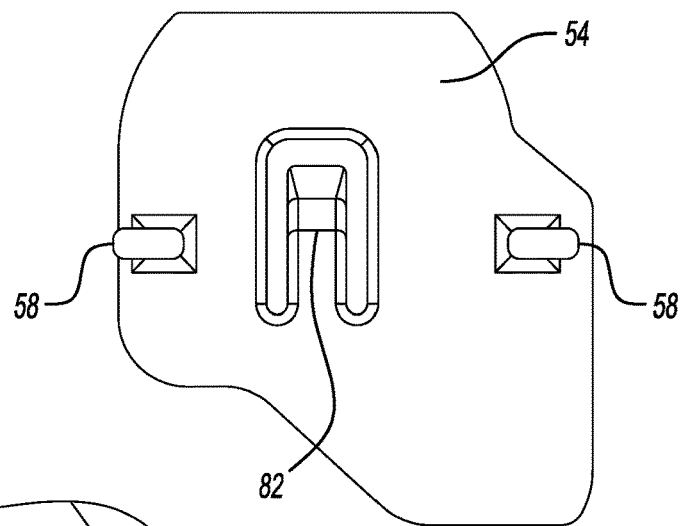
FIG. 8C shows a bottom view of the access control member of FIG. 8A.
Figure 9:
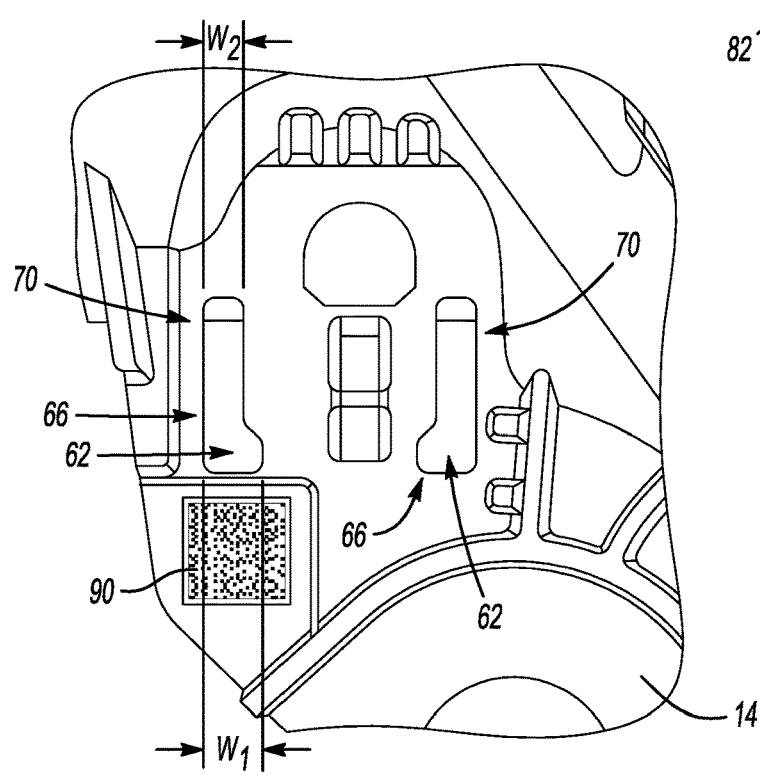
FIG. 9 shows an area of the lamp housing containing slots utilized to couple the access control member to the lamp housing.

With reference now to FIGS. 8A-9, the example access control member 54 includes, among other things, a pair of arrow tabs 58 that fit within respective slots 62 of the lamp housing 14. The slots 62 each extend from respective first end portions 66 to second end portions 70.

The access control member 54 is initially coupled to the lamp housing 14 by inserting the arrow tabs 58 into the slots 62 at the position in the first end portion 66. A width $W_1$ of the first end portion is greater than a width $W_2$ of the second end portion 70. The increased width $W_1$ of the first end portions 66 facilitates the insertion of the arrow tabs 58 into a coupled position with the lamp housing 14.

After sliding the access control member 54 from the accessing position to the covering position, the arrow tabs 58 are within the second end portions 70 of the slots 62. These portions of the slots 62 are narrower, which helps to hold the access control member 54 firmly in the covering position. In the covering position, the access control member 54 completely covers the aperture 50, as shown in FIG. 6.

The access control member 54, in the exemplary embodiment, includes a ramped area 74, a platform 78, the arrow tabs 58, and a snap-fit feature 82. The ramped area 74 extend from a first side of the platform area 78. The arrow tabs 58 extend from an opposite, second side of the platform 78. The access control member 54 can be a polymer or polymer-based material. Typically, the access control member 54 can be molded or otherwise manufactured separately from the lamp housing 14. The arrow tabs 58 are then inserted into the first end portions 66 of the slots 62 to couple the access control member 54 to the lamp housing 14.

The snap-fit feature 82 is within the platform 78. When the access control member 54 is in the accessing position, the snap-fit feature 82 fits into a recessed area 86 of the lamp housing 14 to help hold the access control member 54 in the accessing positon.

The assembler, for example, can then press against the ramped area 74 to move the access control member 54 from the accessing position to the covering position. The force applied by the assembler to the ramped area urges the snap-fit feature 82 out of the recessed area 86 so that the access control member 54 can slide to the covering position.

After sliding the access control member 54 to the covering position, the snap-fit feature 82 moves into the aperture 50 to secure and "snap-fit" the access control member 54 into the covering position. The ramped area 74 of the access control member 54 can prevent tampering the snap-fit feature 82 should a user attempt to move the access control member 54 from the covering position shown in FIG. 7. The outer surface of the ramped area 74 can include a series of ribs or other gripper ribs 88 or other gripper features that help the user slide the access control member 54 from the accessing position to the covering position.

With reference to FIGS. 6 and 9, a label 90 is positioned on the lamp housing 14. When the access control member 54 is in the accessing position, the access control member 54 and, specifically, the platform 78 of the access control member 54, covers the label 90. The platform 78 can include a region that protrudes from other portions of the access control member 54 to cover the label 90 when the access control member 54 is in the accessing position.

When the access control member 54 is transitioned to the covering position of FIGS. 6 and 9, the platform 78 no longer conceals the label 90. That is, the label 90 revealed when the access control member 54 is in the covering position. Because the label 90 is revealed, a camera or other optical recognition device can scan the label 90.

If the access control member 54 has not been moved to the covering position, a portion of the platform 78 could cover the label 90 preventing the optical device from reading the label 90. The inability to read the label 90 can prompt an alert to the assembler that the access control member 54 has not been properly positioned.

The label 90, in the exemplary embodiment, includes information, such as a part number or other part specific information, that can help to identify the headlamp assembly 10.

The label 90, in this example, is secured to the lamp housing 14 within a recessed area 86 of the lamp housing 14. This can help to space the label 90 a bit from the platform 78 of the access control member 54 so that moving the access control member 54 is not hindered by contact with the label 90 or so that movement of the access control member 54 does not damage the label 90.

Features of some of the disclosed examples include a sliding member that can lock out an end user from accessing a headlamp adjuster system. The member can be non-serviceable to restrict end user access to the adjuster system, and particularly a horizontal adjuster of the headlamp adjuster system.

The foregoing description shall be interpreted as illustrative and not in any limiting sense. A assembler of ordinary skill in the art would understand that certain modifications could come within the scope of this disclosure. For these reasons, the following claims should be studied to determine the true scope and content of this disclosure.

What is claimed is:

1. An assembly, comprising: a lamp housing; a headlamp adjuster assembly; an access control member moveable from an accessing position to a covering position while coupled to the lamp housing, the headlamp adjustor assembly accessible through an aperture in the lamp housing when the access control member is in the accessing position, the headlamp adjustor assembly inaccessible through the aperture in the access control member when the access control member is in the covering position; and a label that is concealed when the access control member is in the accessing position and revealed when the access control member is in the covering position.

2. The assembly of claim 1, wherein the headlamp adjuster system includes an adjuster cap coupled to a shaft to adjust an aiming position of a headlamp.

3. The assembly of claim 2, wherein the aiming position is a horizontal aiming position.

4. The assembly of claim 1, wherein the access control member includes a pair of arrow tabs that fit within respective slots of the lamp housing to couple the access control member to the lamp housing.

5. The assembly of claim 4, wherein areas the respective slots each extend from a first end portion to an opposite second end portion that is closer to the aperture in the lamp housing than the first end portion, the first end portion wider than the second end portion.

6. The assembly of claim 1, wherein the access control member is slidably coupled to the lamp housing such that the access control member slides from the accessing position to the covering position while coupled to the lamp housing.

7. The assembly of claim 1, wherein the access control member is configured to snap-fit to the lamp housing when the access control member is in the covering position to hold the access control member in the covering position.

8. The assembly of claim 1, wherein the label includes a QR code that is readable when the access control member is in the covering accessing position.

9. The assembly of claim 1, wherein the label includes identification information associated with the assembly.

10. The assembly of claim 1, wherein the label is secured to a recessed area of the lamp housing.

11. The assembly of claim 1, wherein the access control member is a polymer-based material.

12. The assembly of claim 1, wherein the access control member includes a snap-feature and a ramped area covering the snap-feature, the snap-feature configured to engage the lamp housing when in the covering position, the ramped area configured to block access to the snap-feature.

13. A method, comprising:
inserting an adjustment tool within an aperture of a lamp housing;
engaging the adjustment tool with a headlamp adjuster system within the lamp housing;
adjusting a position of a headlamp using the adjustment tool and the headlamp adjuster system;
withdrawing the adjustment tool from the aperture;
sliding an access member from an accessing position to a covering position where the access control member covers the aperture; and
sliding the access control member to the covering position reveals a label.

14. The method of claim 13, wherein the access control member is coupled to the lamp housing when in both the accessing position and the covering position.

15. The method of claim 14, wherein the access control member includes at least one arrow tab that couples the access control member to the lamp housing when the access control member is in the accessing position and when the access control member is in the covering position.

16. The method of claim 13, wherein the access control member includes a snap-feature and a ramped area covering the snap-feature, the snap-feature configured to engage the lamp housing when in the covering position, the ramped area configured to block access to the snap-feature.

17. The method of claim 13, wherein the label includes identifying information about the headlamp.

18. The method of claim 13, wherein the label is disposed on a recessed area of the lamp housing.

\* \* \* \* \*

UNITED STATES PATENT AND TRADEMARK OFFICE
CERTIFICATE OF CORRECTION

Page 1 of 1

PATENT NO. : 11,142,116 B1
APPLICATION NO. : 16/996521
DATED : October 12, 2021
INVENTOR(S) : Donald John Nakic, Nicholas James Nowicki and Anthony Nicholas Aquilina It is certified that error appears in the above-identified patent and that said Letters Patent is hereby corrected as shown below:

In the Claims

Claim 8, Column 6, Line 31; replace "covering accessing position" with --covering position--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*